(12) United States Patent
Sakai et al.

(10) Patent No.: US 7,433,595 B2
(45) Date of Patent: Oct. 7, 2008

(54) OPTICAL SIGNAL TRANSMISSION APPARATUS AND OPTICAL SIGNAL TRANSMISSION METHOD

(75) Inventors: Kazuhiro Sakai, Ashigarakami-gun (JP); Yoshihide Sato, Ashigarakami-gun (JP); Masaru Kijima, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 531 days.

(21) Appl. No.: 11/068,923

(22) Filed: Mar. 2, 2005

(65) Prior Publication Data

US 2006/0008276 A1 Jan. 12, 2006

(30) Foreign Application Priority Data

Jul. 6, 2004 (JP) ............................. 2004-199225
Jan. 21, 2005 (JP) ............................. 2005-014005

(51) Int. Cl.
*H04B 10/08* (2006.01)
*H04B 17/00* (2006.01)

(52) U.S. Cl. ............................. 398/10; 398/13; 398/15
(58) Field of Classification Search .................... 398/67
See application file for complete search history.

(56) References Cited

U.S. PATENT DOCUMENTS 4,994,675 A * 2/1991 Levin et al. .................. 250/551
5,005,939 A * 4/1991 Arvanitakis et al. ........... 385/53
5,095,308 A * 3/1992 Hewitt ........................ 340/7.38
5,315,679 A * 5/1994 Baldwin et al. ............... 385/76
5,636,077 A * 6/1997 Kim .............................. 360/69
6,359,708 B1 * 3/2002 Goel et al. .................... 398/15
6,504,630 B1 * 1/2003 Czarnocha et al. ............ 398/15

FOREIGN PATENT DOCUMENTS

| JP | A 5-244099 | 9/1993 |
| JP | A 6-67391 | 3/1994 |
| JP | A 2001-185783 | 7/2001 |

* cited by examiner

*Primary Examiner*—Shi K Li
(74) *Attorney, Agent, or Firm*—Oliff & Berridge, PLC (57) ABSTRACT

The present invention provides an optical signal transmission apparatus for carrying out bi-directional light transmission. The optical signal transmission apparatus includes: a light sending module, for sending an optical main-signal having at least one data width, and receiving an optical sub-signal including a control signal; a light receiving module for receiving the optical main-signal and sending the optical sub-signal; and an optical cable for connecting between the light sending module and the light receiving module, wherein the light sending module comprises a control component which controls the output of the optical main-signal such that the output of the optical main-signal is stopped, when the optical sub-signal, which includes as data the reception status of the optical main-signal, is not being received, or when the reception status of the optical main-signal is indicating non-receiving.

10 Claims, 9 Drawing Sheets

OPTICAL SIGNAL TRANSMISSION APPARATUS AND OPTICAL SIGNAL TRANSMISSION METHOD

CROSS-REFERENCE TO RELATED APPLICATION

This application claims priority under 35USC 119 from Japanese Patent Application Nos. 2004-199225 and 2005-14005, the disclosures of which are incorporated by reference herein.

BACKGROUND OF THE INVENTION

1. Field of the Invention

The present invention relates to an optical signal transmission apparatus and an optical signal transmission method, and more particularly to an optical signal transmission apparatus and an optical signal transmission method which use optical signals.

2. Description of the Related Art

With liquid crystal panels and plasma displays being provided with higher resolutions, it is desired that large-volume video signals from the host be transmitted whilst being kept in a digital format. For example, the DVI (Digital Visual Interface) standard, which has been defined by DDWG (Digital Display Working Group), an industry organization, is a standard for differential signaling called TMDS (Transition Minimized Differential Signaling) which transmits signals at a rate as high as 1.65 G bps per channel. As a medium for such high-speed signaling, metallic cable with a shield that is in wide spread use as a display cable is generally used, however, because of the high speed signaling, a problem that the length of the cable cannot be extended to over 10 m has arisen. An optical cable for realizing long distance transmission by converting this high-speed signal to light has been proposed, however, problems still to be solved are power consumption and safety in handling the laser light source.

As a technique which improves the handling safety of the laser light source, art which stops the laser light when the laser light leaks, as when disconnecting the optical connector, has been proposed (for example, Japanese Patent Application Laid-Open (JP-A) No. 5-244099/1993 and JP-A No. 2001-185783).

The art as disclosed in JP-A No. 5-244099/1993 proposes that an actuating signal for verifying the connection is sent in the direction opposite to the main-signal, which comprises video signals and the like. When the actuating signal for verifying the connection is not detected, on the main-signal sending apparatus side, sending of the main-signal is disabled.

The art as disclosed in JP-A No. 2001-185783 proposes that an electro-optical composite cable provided with electrically conductive terminals in the optical plug is used for connection, and when there is conductivity between the optical connector portions at both cable ends, the connection being verified, light is outputted.

As well as these, art as disclosed in national publication of the translated version No. 6-67391/1994 and others are proposed. With the art as disclosed in national publication of the translated version No. 6-67391/1994, it is proposed to check the link conditions of the respective sending and receiving modules of a full double optical fiber link, stopping the laser output when the reception signal is in a non-receiving status, and periodically illuminating the laser for prescribed periods of time with the use of a timer.

With the above-mentioned prior arts, however, the normal connection of the transmission medium is detected by only using a single method. This gives the problem that, if the optical connector is disconnected when the single method is malfunctioning for some reason, leakage of laser light can occur.

With the art as disclosed in JP-A No. 2001-185783, cost is increased because a specialized medium for connection verification is required.

Further, the art as disclosed in national publication of the translated version No. 6-67391/1994 uses a timer, thus the condition of the link is continuously inspected, even if there is no need to transmit a signal. This has an undesirable effect on the power consumption and the service life of the light emitting device.

SUMMARY OF THE INVENTION

The present invention has been made in view of the above circumstances and provides an optical signal transmission apparatus and an optical signal transmission method.

A first aspect of the present invention provides an optical signal transmission apparatus for carrying out bi-directional light transmission, comprising a light sending module for sending an optical main-signal having at least one data width, and receiving an optical sub-signal including a control signal; a light receiving module for receiving the optical main-signal and sending the optical sub-signal; and an optical cable for connecting between the light sending module and the light receiving module, wherein the light sending module comprises a control component which controls the output of the optical main-signal such that, in at least one of the cases when the optical sub-signal including the reception status of the optical main-signal as data is non-receiving, and when the reception status is non-receiving, the output of the optical main-signal is stopped.

According to the first aspect, the optical main-signal having at least one data width is transmitted from the light sending module to the light receiving module through the optical cable, and the optical sub-signal including the reception status of the optical main-signal as data is transmitted from the light receiving module to the light sending module. For example, as the light source for the optical main-signal, a laser light source can be used, and as the light source for the optical sub-signal, an LED light source can be used.

Here, when the optical sub-signal is not being received, or when the reception status of the optical main-signal indicates non-receiving, the output of the optical main-signal is stopped by the control component. In other words, the output of the optical main-signal is stopped when the optical sub-signal changes to not being received, and the optical main-signal status becomes non-receiving, due to such causes as the optical cable being non-connecting or damaged. Thereby, leakage of the optical main-signal from the optical cable can be positively prevented. For example, when a laser light source is used as the light source of the optical main-signal, as described above, leakage of the laser light can be prevented.

Further, under one or other (or both) of two conditions (the optical sub-signal not being received or the optical main-signal status being non-receiving), the output of the optical main-signal is stopped. Thus if a circuit or the like for detecting one of the conditions fails, the circuit for detecting the other is capable of stopping the output of the optical main-signal. This allows safety to be improved with leakage of the laser light being reliably prevented.

A second aspect of the present invention provides an optical signal transmission method for carrying out bi-directional light transmission, comprising: (a) by a light sending module, sending an optical main-signal having at least one data width, and receiving an optical sub-signal including a control signal; (b) by a light receiving module, receiving the optical main-signal and sending the optical sub-signal; and (c) by the light sending module, controlling the output of the optical main-signal such that, in at least one of the cases when the optical sub-signal including the reception status of the optical main-signal as data is non-receiving, and when the reception status is non-receiving, the output of the optical main-signal is stopped.

As described above, the present invention provides an effect that, when the optical sub-signal is not being received, or when the reception status [of the optical main-signal] is non-receiving, the output of the optical main-signal is stopped. Hence leakage of the laser light can be positively prevented and thus safety can be improved.

BRIEF DESCRIPTION OF THE DRAWINGS

Preferred embodiments of the present invention will be described in detail based on the following figures, wherein:

FIG. 6 is a timing chart illustrating a startup sequence at the time of power-on;

DETAILED DESCRIPTION OF THE INVENTION

Hereinbelow, an example of an embodiment of the present invention will be explained in detail with reference to the drawings.

(Entire Configuration)

Figure 1:
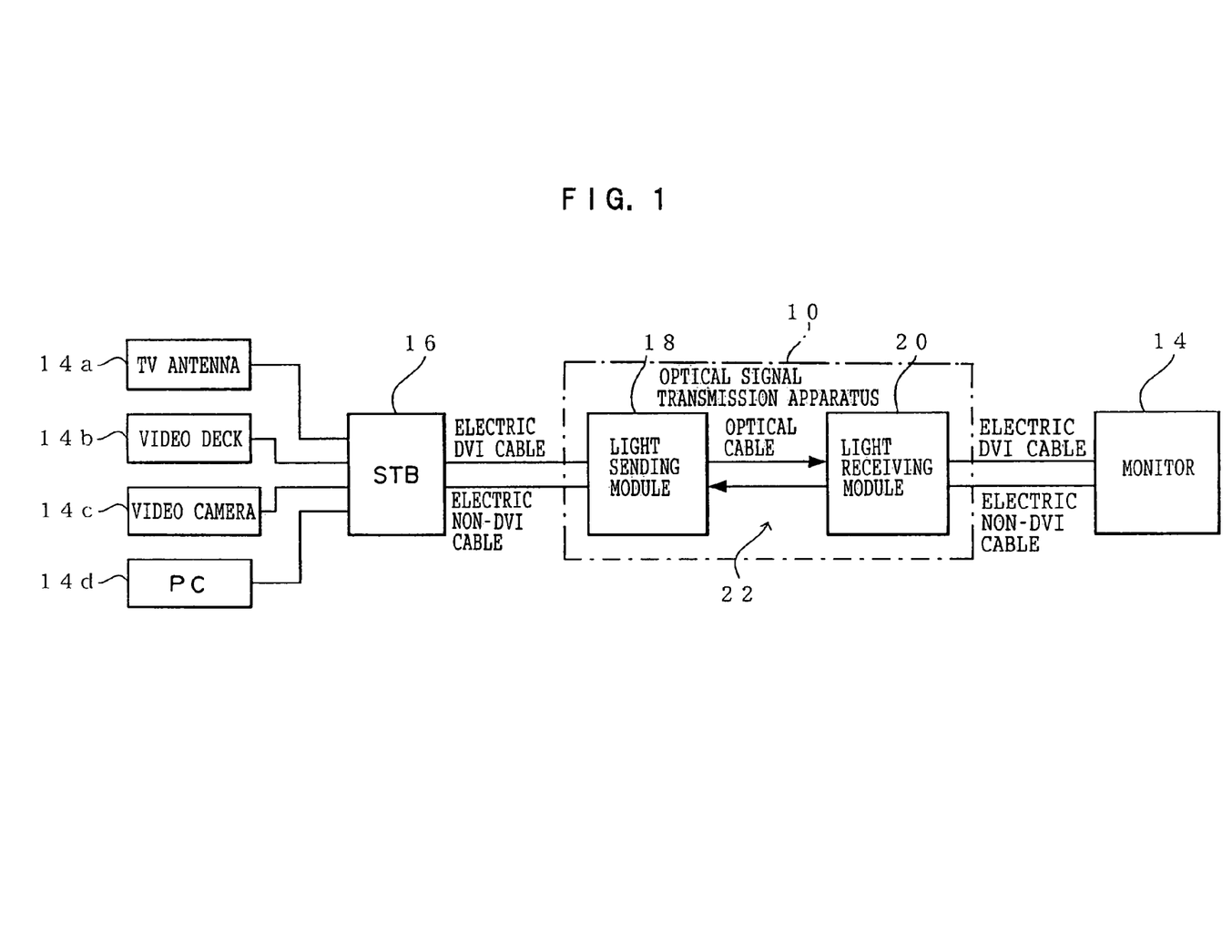
FIG. 1 is a block diagram illustrating a schematic configuration of a video signal transmission system according to embodiments of the present invention.

As shown in FIG. 1, a video signal transmission system according to the present embodiment is a system that selects a video/image signal from various media to display it on a monitor 14.

The various media are, for example, a TV antenna 14a, a video deck 14b, a video camera 14c, a personal computer (PC) 14d, and the like. The system can be applied to television signals obtained from the antenna 14a, video signals obtained from the video deck 14b, video camera 14c, and the like, image signals obtained from the PC 14d, and the like.

A video/image signal from each of the various media is outputted as a video signal, corresponding to each of the various interfaces, by a device called a set top box (STB) 16. This STB 16 selects a video/image signal and outputs it as a video signal, via an optical signal transmission device 10, to be displayed on the monitor 14, such as a plasma display.

As signals which are transmitted by the optical signal transmission device 10, DVI signals and the like to the DVI standard, are applicable. This is a video signal standard defined by DDWG (Digital Display Working Group), an industry organization. In addition to DVI signals, non-DVI signals, which are used for exchanging audio information, remote control information and the like are also covered.

DVI signals are: R, G, B video signals (TMDS data0, TMDS data1, TMDS data2) and a pixel clock (TMDS Clock), which are 4-bit differential signal pairs called TMDS signals; a DDC signal, consisting of a DDC Clock signal and a DDC Data signal for exchanging display information between the host (STB 16) and the monitor 14; a 5V Power signal; and an HPD signal for indicating the status of connection between the host 16 and the monitor 14. Non-DVI signals are an audio signal, and signals for exchanging remote control information (herein called user data). Here the combination of the image signal for each color and the pixel clock is referred to as a video signal.

(Optical Signal Transmission Apparatus)

Figure 2:
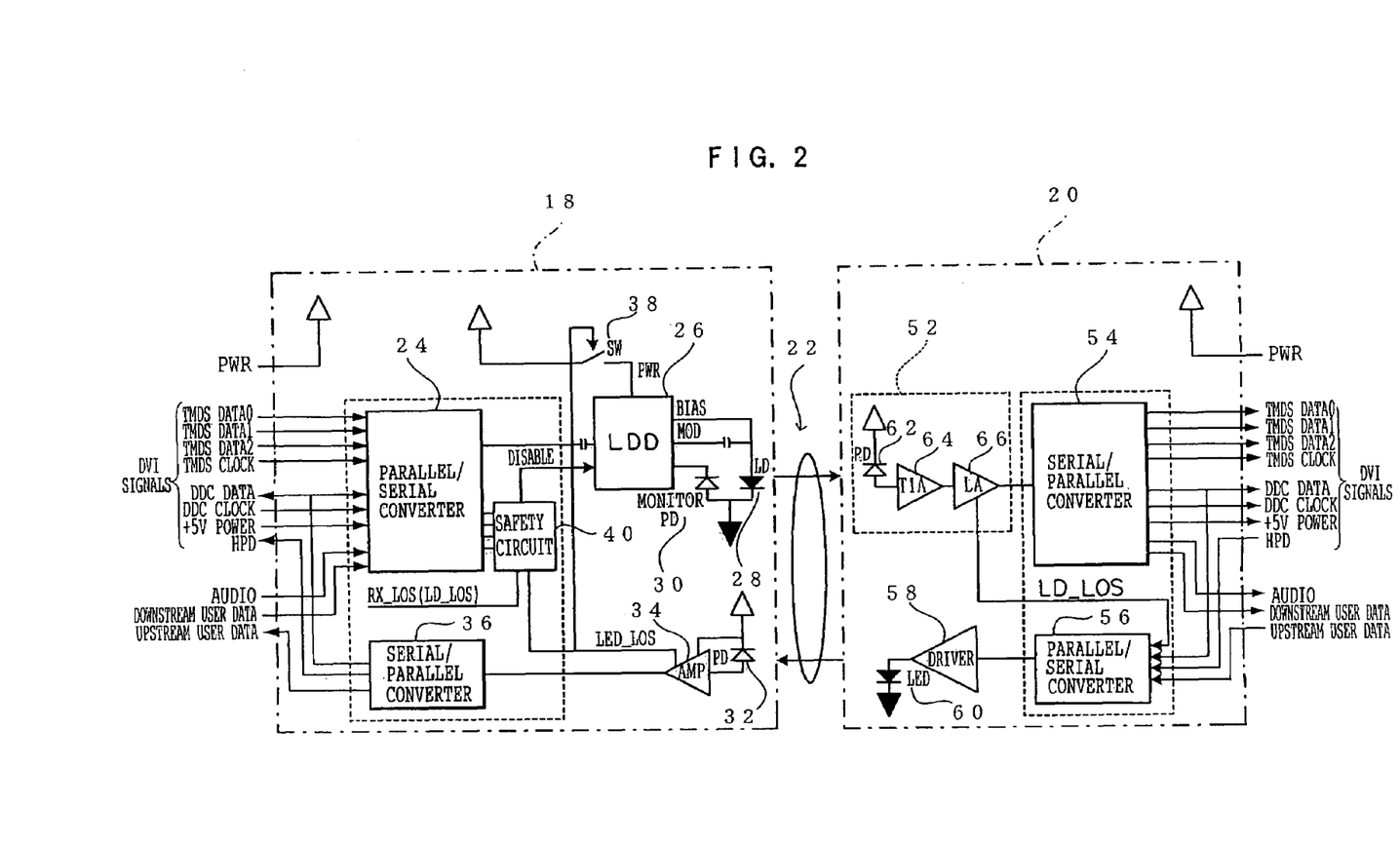
FIG. 2 is a block diagram illustrating the configuration of an optical signal transmission apparatus in the video signal transmission system according to embodiments of the present invention.

As shown in FIG. 1 and FIG. 2, the optical signal transmission apparatus 10: comprises a light sending module 18, a light receiving module 20, and an optical cable 22 for connecting these modules to each other; and, transmits a video signal, as a signal having at least one data width from the light sending module 18 to the light receiving module 20 through the optical cable 22.

(Light Sending Module)

The light sending module 18 is provided with a parallel/serial converter 24 for converting the video data and the like of the DVI signals from parallel to serial, and outputs a serial signal as a result of the parallel/serial conversion to a laser source driver (LDD) 26 for converting the serial signal to an optical signal. The LDD 26 outputs a BIAS signal and a MOD signal, which are for outputting the light modulated according to the obtained serial signal, to a laser source (LD) 28 for driving the LD 28. The LD 28 emits light modulated on the basis of the BIAS signal and MOD signal outputted from the LDD 26, and includes a monitor PD 30 which monitors the amount of light emitted by the LD 28. The monitor PD 30 monitors the amount of light emitted from the LD 28 to give feedback to the LDD 26.

Specifically, the signals from the host 16 to the monitor 14 are video signals, a DDC signal, a 5V Power signal, an audio signal, and a downstream user data signal. The signals inputted to the light sending module 18 are converted from parallel to serial by the parallel/serial converter 24, and then transmitted to the light receiving module 20 through the optical cable 22 after being converted from electric to optical by the LDD 26 and the LD 28. The optical signal transmitted from the light sending module 18 to the light receiving module 20 is referred to as the optical main-signal.

Because the optical main-signal contains video signals, high-speed signaling is required, and for example, a transmission rate of 2 Gbps or over is required for WXGA (1280×768 pixels). Therefore, a laser diode that is capable of high-speed modulation (for example, Fuji Xerox VCSEL-AM-0001-C or the like) is used, and a relatively high laser output is required.

Further, the light sending module 18 is provided with a photo diode (PD) 32 for receiving an optical signal outputted from an LED 60 in the light receiving module 20, and the optical signal is converted to an electric signal by the PD 32. The electric signal outputted from the PD 32 is amplified by an amplifier (AMP) 34, and converted to a parallel signal by a serial/parallel converter 36 to be outputted to the host 16.

Here, the AMP 36 outputs an LED_LOS signal, which indicates whether or not light has been received from the light receiving module 20, to a safety circuit 40, described later, and a switch 38 as a first control component. In the serial/parallel converter 36, an LD_LOS (Loss of Power) signal, which indicates the reception status of the optical main-signal included in the signals transmitted from the light receiving module 20, is outputted to the safety circuit 40 as an Rx_LOS signal. The optical signal transmitted from the light receiving module 20 to the light sending module 18 is called an optical sub-signal. The LED_LOS signal is a binary level signal, which is outputted at the low level in the normal status and at the high level in the status when a signal is not being received.

(Safety Circuit)

Figure 3:
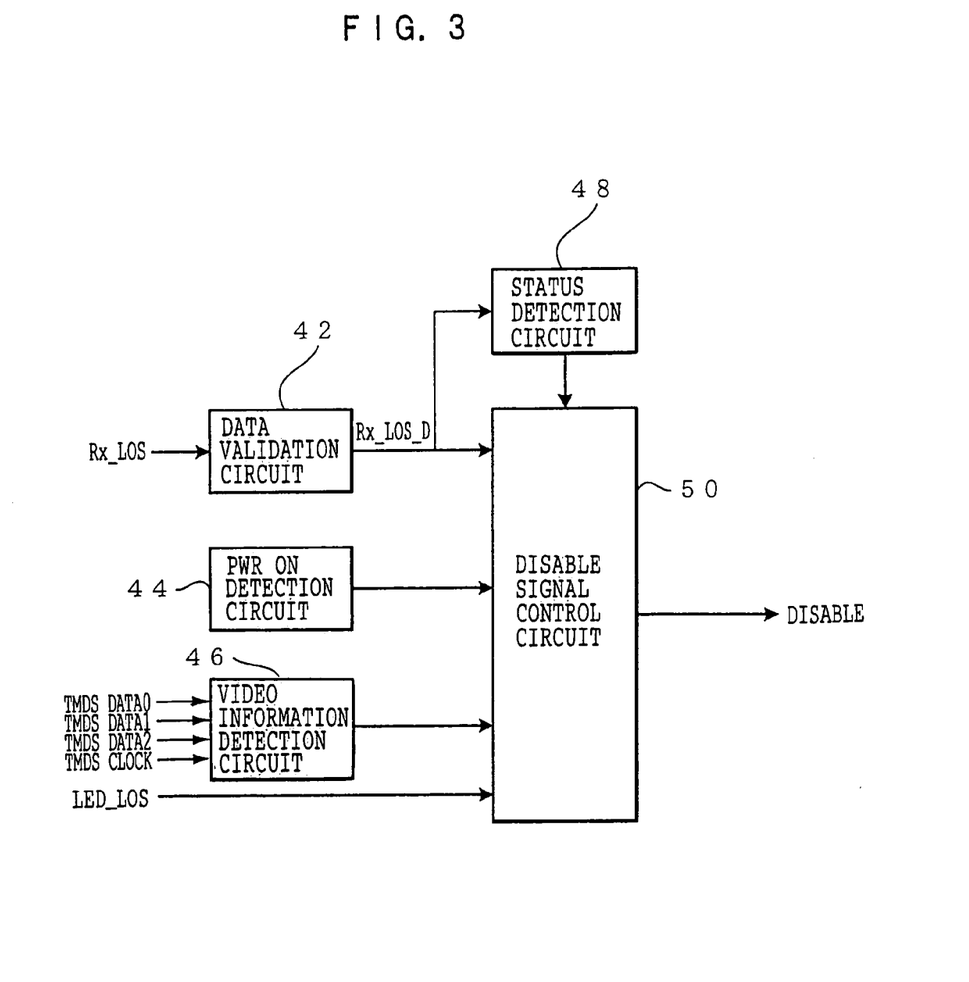
FIG. 3 is a block diagram illustrating a configuration of a safety circuit.

The safety circuit 40 controls the LDD 26 such that the LD 28 stops emitting light when the optical cable 22 is not connected or the optical cable 22 has is damaged or the like. Particularly, as shown in FIG. 3, the safety circuit 40 comprises a data validation circuit 42, a power-on (PWR ON) detection circuit 44, a video information detection circuit 46, a status detection circuit 48, and a disable signal control circuit 50.

When the same data has been repeated in succession a prescribed number of times (for example, three times) at the frame rate for the optical sub-signal (the data rate on the parallel signal side) transmitted from the light receiving module 18, the data validation circuit 42 changes over the high and low of the data, and outputs an Rx_LOS_D signal to the disable signal control circuit 50 and the status detection circuit 48. In other words, the data validation circuit 42 validates the data when the same data has been successively repeated a prescribed number of times.

The status detection circuit 48 detects the reception status of the optical main-signal through the Rx_LOS_D signal outputted from the data validation circuit 42, and outputs the detection result to the Disable signal control circuit 50. The power-on detection circuit 44 detects the power-on of the light sending module 18 and outputs the result to the disable control circuit 50. The video information detection circuit 46 detects the video information in the video signals and outputs the result to the disable control circuit 50.

The disable signal control circuit 50 outputs a disable signal to the LDD 26 on the basis of the inputted signals in order to control the driving of the LD 28 by the LDD 26. The disable control circuit 50 corresponds to the second control component of the present invention.

(Light Receiving Module)

In the light receiving module 20 the OE conversion section 52 outputs electric signals, as a result of conversion of the light received from the light sending module 18 through the optical cable 22 from optical to electric (OE), to the serial/parallel converter 54, and outputs an LD_LOS signal indicating the reception status of the optical main-signal included in the electric signals to the parallel/serial converter 56. The parallel signal, as a result of conversion by the serial/parallel converter 54, is transmitted to the monitor 14 side. The LD_LOS signal is a two-value level signal which is set to be at the low level in the normal status, and is outputted as a high level signal when no optical signal is received due to such causes as the optical plug being disconnected or the fiber being broken resulting in damage. The LD_LOS signal is transmitted as an optical sub-signal as one of the signals from the monitor 14 to the host 16 together with DDC Data signal, an HPD signal and an upstream user data signal. The light source of this optical sub-signal is the LED 60, which is set to be always in the transmission state (illuminated state including blinking) when the light receiving module 20 is in the ON state, with the power being turned on. The amount of light outputted by the LED 60 is set to be a sufficiently small amount of light from the viewpoint of operator safety. Thereby, operation checks may be performed on the light emission of the LED 60.

The OE conversion section 52 comprises: a photo diode (PD) 62, which receives an optical signal transmitted from the light sending module 18; a TIA (Transimpedance Amp) 64, which converts the electric signal obtained as a result of conversion by the PD 62 from current-to-voltage; and an LA (Limiting Amp) 66, which amplifies the voltage of the signal resulting from the current-to-voltage conversion.

The signal transmitted from the light receiving module 20 to the light sending module 18 is converted to a serial signal by the parallel/serial converter 56 before being outputted to a driver 58 for driving the LED 60. The signal is then subjected to an electric-to-optical conversion by the driver 58 and the LED 60 to be transmitted to the light sending module 18.

Because the optical sub-signal requires no high-speed signaling rate, the LED 60 can be used, and by using the LED 60 of visible light, operation checks can be performed while safety is secured when connecting the connector and the like.

(Optical Cable)

Figure 4:
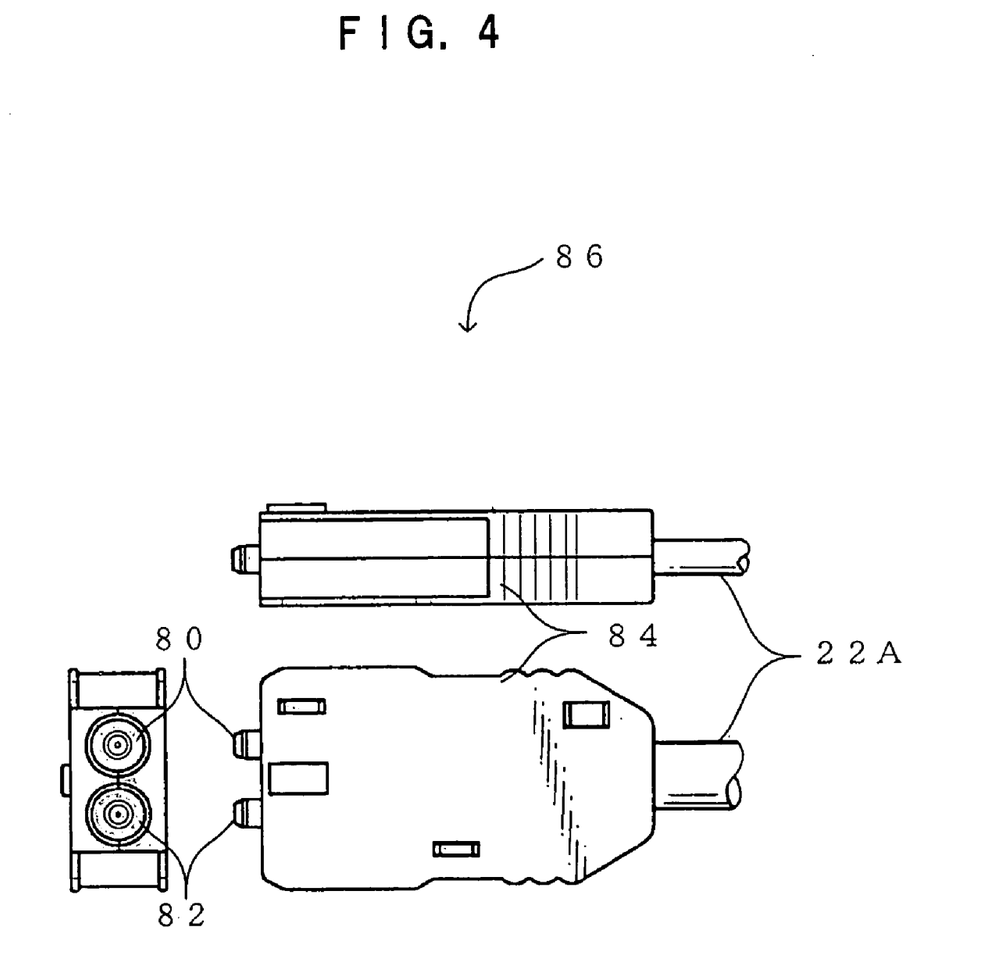
FIG. 4 is a block diagram illustrating a configuration of an optical plug.

As shown in FIG. 4, the optical cable 22 comprises: an optical plug 86, with which an optical main-signal terminal 80 to which an optical fiber for the optical main-signal is connected, and an optical sub-signal terminal 82 to which an optical fiber for the optical sub-signal is connected, these being fixed by a common housing 84; and, an optical fiber bundle 22A, in which the optical fiber for the optical main-signal and the optical fiber for the optical sub-signal, which are connected to the optical plug 86, are bundled.

In other words, by connecting/disconnecting the optical plugs 86 to/from the light sending module 18 and light receiving module 20, connection/disconnection of the optical fiber for the optical main-signal and that for the optical sub-signal can be performed at the same time.

(Function)

Next, the mechanism for stopping the optical main-signal when the optical cable 22 has had an obstruction, including connection/disconnection of the optical plug 86, will be explained.

In the light receiving module 20, in the course of the amplification process(the current-to-voltage conversion by the TIA 64 and the voltage amplification by the LA 66) following the optical-to-electric conversion by the PD 62, an LD_LOS signal indicating the reception status of the optical main-signal is outputted. This signal is converted to a serial signal by the parallel/serial converter 56 before being subjected to an electric-to-optical conversion by the driver 58 and the LED 60, and then being transmitted to the light sending module 18. The LD_LOS signal is transmitted, as one of the signals within the optical sub-signal given by the LED 60 from the monitor 14 to the host 16, together with a DDC Data signal, an HPD signal and an upstream user data signal.

The optical sub-signal transmitted to the light sending module 18 is optical-to-electric converted by the PD 32, and amplified to a prescribed logic level by the AMP 34 before being converted to a parallel signal by the serial/parallel converter 36. The LD_LOS signal included in the optical sub-signal is extracted as an Rx_LOS signal in the light sending module 18, and is outputted to the data validation circuit 42 in the safety circuit 40.

With the data validation circuit 42 in the safety circuit 40, when the same data has been repeated in succession a prescribed number of times (for example, three times) at the frame rate for the optical sub-signal, the Rx_LOS signal is validated, and is outputted to the disable signal control circuit 50 as an Rx_LOS_D signal. The prescribed number of times is set such that when there is a leakage of the laser, the energy before then safety circuit 40 cuts off the power to the laser is sufficiently low from a safety perspective. In other words, even if the optical sub-signal has false data, the data validation circuit 42 is capable of preventing malfunctioning.

Then, based on the Rx_LOS_D signal, the disable signal control circuit 50 outputs a disable signal to the LDD 26. Here, when the Rx_LOS signal (the Rx_LOS_D signal) is in the low level status, the disable control circuit 50 outputs a disable signal as a low level signal in order to control the LDD 26 so as to cause the LD 28 to normally emit the light, and when the Rx_LOS signal (the Rx_LOS_D signal) is in the high level status, the disable control circuit 50 outputs a disable signal as a high level signal in order to control the LDD 26 so as to cause the LD 28 to stop the light emission, whereby the optical main-signal is stopped. By thus processing, the optical main-signal can be stopped in accordance with the reception status of the optical main-signal.

Further, in the light sending module 18, in the course of the amplification following the optical-to-electric conversion by the PD 32, an LED_LOS signal indicating the reception status of the optical sub-signal is extracted, and control of the switch 38, as a first control component for controlling the supply of power to the LDD 26, is carried out. Here, when the LED_LOS signal is in the low level status, the power supply to the LDD 26 is controlled to turn the switch 38 on for causing the LD 28 to normally emit the light, and when the LED_LOS signal is in the high level status, the power supply to the LDD 26 is controlled to turn the switch 38 off for causing the LD 28 to stop the light emission, whereby the optical main-signal is stopped.

Specifically, the following processing is carried out each time the optical plug is connected, the power is switched on, and a video signal is detected.

Figure 5:
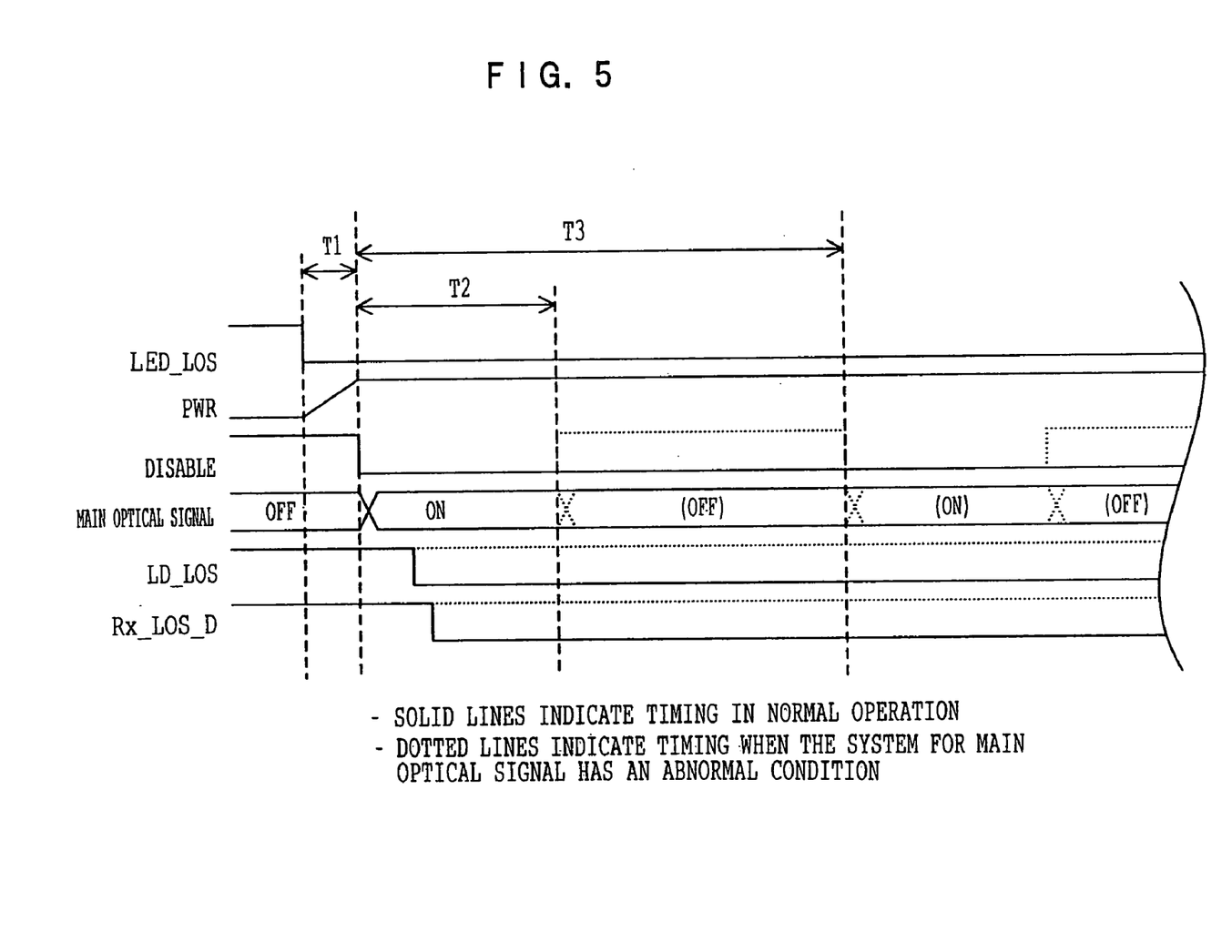
FIG. 5 is a timing chart illustrating a reset sequence at the time of optical plug connection.

At the time of the optical plug connection, the reset sequence is carried out as illustrated with a timing chart as shown in FIG. 5. FIG. 5 is a timing chart illustrating the reset sequence at the time of the optical plug 86 connection.

When the respective optical plugs 86 are connected to the light sending module 18 and the light receiving module 20, the PD 32 in the light sending module 18 detects the optical sub-signal, the LED_LOS signal indicating the reception status of the optical sub-signal being changed from the high level to the low level. With this operation, the switch 38 is turned on (the PWR gradually rises) to turn the power for the LDD 26 on, which allows the Disable signal outputted from the Disable signal control circuit 50 to control the laser light output from the LD 28.

After the disable signal control circuit 50 causes the disable signal to be at the low level, to turn the optical main-signal on, the LED_LOS signal falls to the low level there is a time of period T1 (100 ms, for example). This is followed by a time period of T2 (10 ms, for example) during which the LDD 26 is operable. The time period of T1 is sufficiently long for the power for the LDD 26 to be turned on and to start operating. The time period of T2 is sufficiently long for the reception status of the optical main-signal to be verified, after the light emission of the LD 28 has been permitted. T2 is also a time period during which a sufficiently small amount of energy is produced from the viewpoint of safety. If, while the optical main-signal is turned on, the Rx_LOS_D changes from the high level to the low level, with the LD_LOS signal being changed from the high level to the low level, the status detection circuit 48 determines that the optical cable 22 is normally connected and is operable. The system then proceeds to normal operation.

When the Rx_LOS_D signal does not change to the low level within the time period of T2, the connection status of the optical cable 22 is repeatedly checked, 10 times or so for example, during the time period of T3 (500 ms, for example). If the Rx_LOS_D signal changes to the low level, the system then proceeds to normal operation. The time period of T3 provides a time period during which on average a sufficiently small amount of energy is produced from the viewpoint of safety. When the Rx_LOS_D signal remains at the high level, the disable signal is changed to the high level to terminate the reset sequence with the optical main-signal being stopped.

Figure 6:
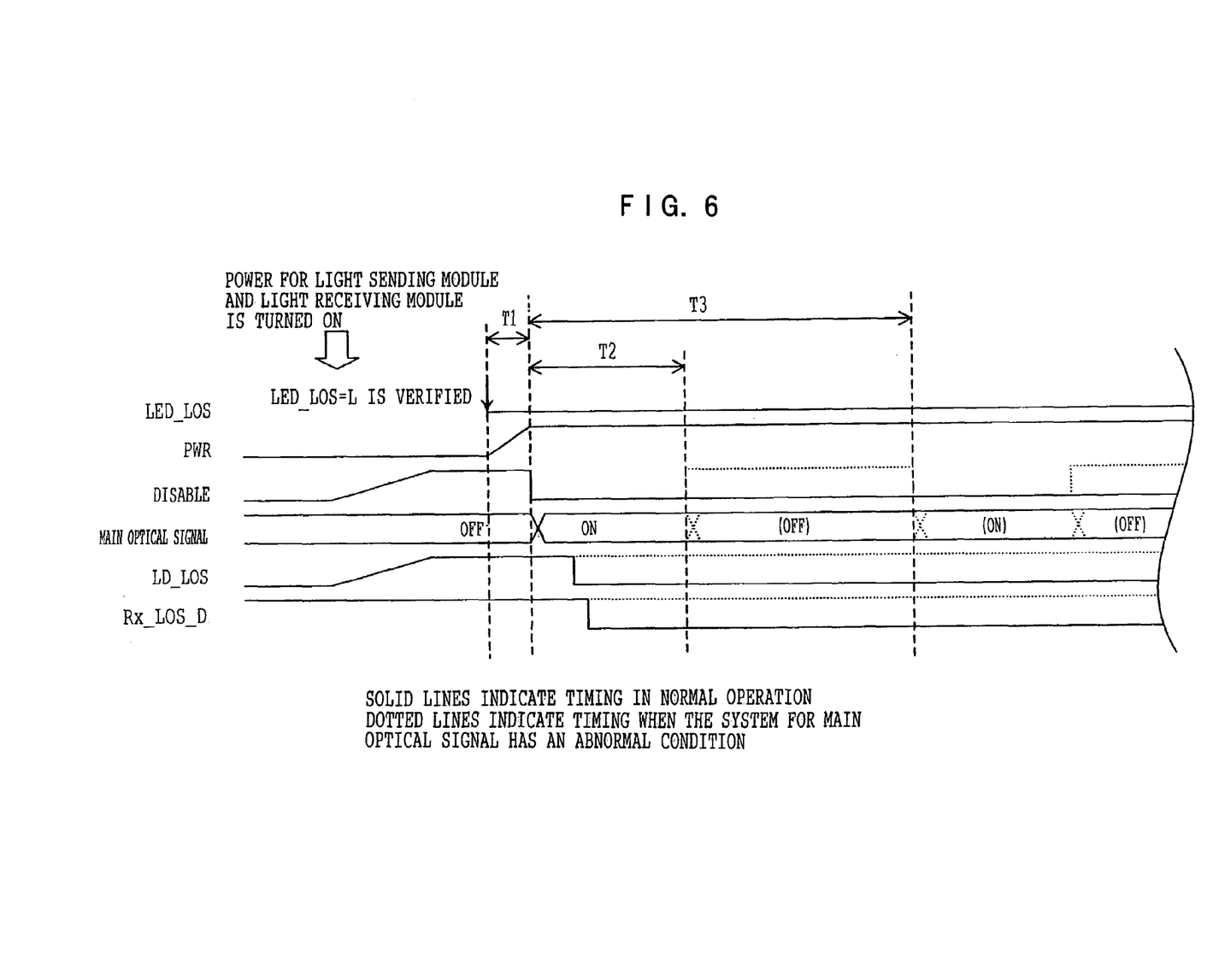

Further, at the time of switching the power on, the startup sequence is carried out as illustrated with a timing chart as shown in FIG. 6. FIG. 6 shows a timing chart illustrating the startup sequence at the time of power-on.

When the power is supplied to the light sending module 18 and the light receiving module 20, in the light sending module 18 the power-on detection circuit 44 detects the power supply, with the disable signal gradually rising to the high level in line with the rise in the power voltage. In the light receiving module 20 the LD_LOS signal also gradually rises to the high level in line with the rise in the power voltage, and also the LED 60 starts sending the optical sub-signal. Here, when the low level of the LED_LOS signal is detected, switch 38 is switched on (PWR gradually rises to the high level), the power for the LDD 26 becomes on, which allows the disable signal outputted from the disable signal control circuit 50 to control the laser light output from the LD 28. The status of the cable 22 connection can then be checked using a reset sequence, like the one described above for when the optical plugs 86 are connected.

After the disable signal control circuit 50 detects that the LED_LOS signal at a low level there is a time period T1 (100 ms, for example). This is followed by a time period of T2 (10 ms, for example) during which the LDD 26 is operable and the disable circuit sends out a low level signal which enables the optical main signal to be emitted. If, while the optical main-signal is turned on, the Rx_LOS_D changes from the high level to the low level, with a change of the LD_LOS signal from the high level to the low level, the status detection circuit 48 determines that the optical cable 22 is normally connected and is operable. The system then proceeds to normal operation.

When the Rx_LOS_D signal has not changed to the low level within the time period of T2, the connection status of the optical cable 22 is repeatedly verified, 10 times or so for example, during the time period of T3 (500 ms, for example) and if the Rx_LOS_D signal changes to the low level, the system then proceeds to normal operation. When the Rx_LOS_D signal remains at the high level, the disable signal is raised to the high level to terminate the reset sequence with the optical main-signal stopped.

Figure 7:
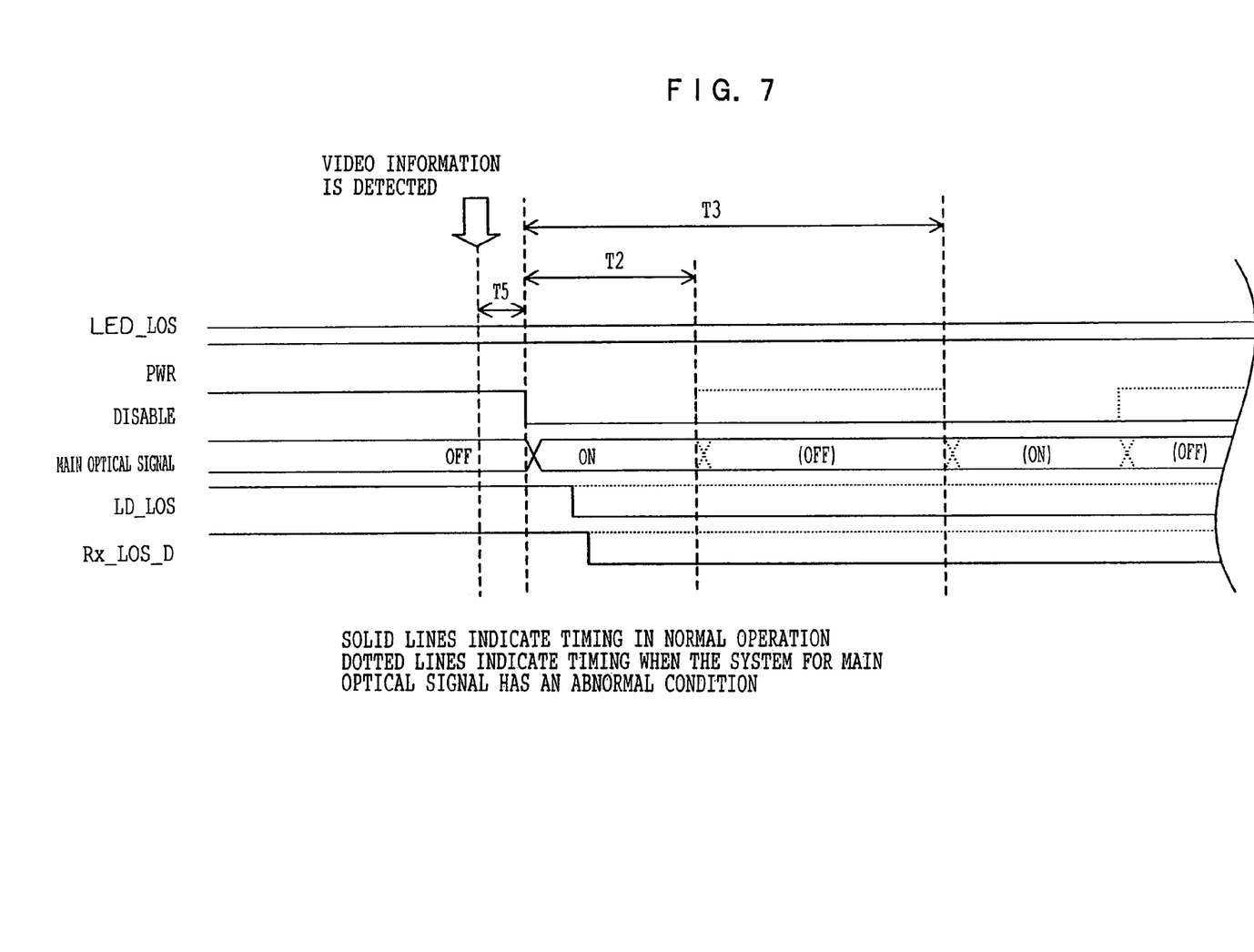
FIG. 7 is a timing chart illustrating a reset sequence at the time of video information detection.

Further, when video information is detected, the reset sequence is carried out as illustrated with a timing chart as shown in FIG. 7. FIG. 7 shows a timing chart illustrating the reset sequence at the time of video information detection.

The video information detection circuit 46 detects the output status of the TMDS signals. Here, if TMDS signals have not been detected, it is determined that no video signals have been given (no signal status), and the disable signal is raised to the high level to stop the optical main-signal output. With this operation, laser light emission when it is not needed is stopped, which allows the power consumption to be reduced and the service life of the LD 28 to be extended.

When TMDS signals are detected by the video information detection circuit 46, the connection status of the optical cable 22 is first verified. After a time period of T5 (1 ms, for example) from the moment when the video information has been detected by the video information detection circuit 46, the disable signal is changed to the low level to verify the connection status of the optical cable 22 in the same way as the above reset sequence at the time of the optical plug 86 connection. FIG. 7 shows the situation when the optical cable 22 maintains the connection, in other words the LED_LOS signal continues at the low level.

After the low level LED_LOS signal is detected there is a time period T5 (100 ms, for example) before the disable signal control circuit 50 causes the disable signal to be at the low level to turn the optical main-signal on. This is followed by a time period of T2 (10 ms, for example), during which the LDD 26 is operable. If, while the optical main-signal is turned on, the Rx_LOS_D changes from the high level to the low level, with a change of the LD_LOS signal from the high level to the low level, the status detection circuit 48 determines that the optical cable 22 is normally connected and is operable. The system then proceeds to the normal operation.

If the Rx_LOS_D signal has not changed to the low level within the time period of T2, the connection status of the optical cable 22 is repeatedly verified, 10 times or so for example, during the time period of T3 (500 ms, for example). If the Rx_LOS_D signal changes to the low level, the system then proceeds to normal operation. If the Rx_LOS_D signal remains at the high level, the disable signal is raised to the high level to terminate the reset sequence with the optical main-signal stopped.

Thus, with the optical signal transmission device 10 in the video signal transmission system according to the present embodiment, the output of the optical main-signal is controlled such that the output of the optical main-signal is stopped in the case when the optical sub-signal, including as data the reception status of the optical main-signal, is not being received, or when the reception status of the optical main-signal indicated is one of non-receiving. This allows positive prevention of leakage of the laser light due to such a cause as the optical cable 22 being unconnected or damaged.

In addition, a two-stage control consisting of the control which stops the optical main-signal when the optical sub-signal is not received, and the control which stops the optical main-signal when the status of the optical main-signal is non-receiving is provided. Thus even if either one of the controls fails, the other control can prevent the laser light from leaking, which allows the safety to be improved.

Next, a modification of the above embodiment will be described.

With the above embodiment, all the DVI signals including the video signals are converted from parallel to serial before being transmitted to the light receiving module, however, there is a modification in which the video signals of the DVI signals transmitted to the light receiving module are not subjected to the parallel/serial conversion. For the same components as those in the above embodiment, the same reference numbers are given in the description hereinafter.

(Overall Configuration)

Figure 8:
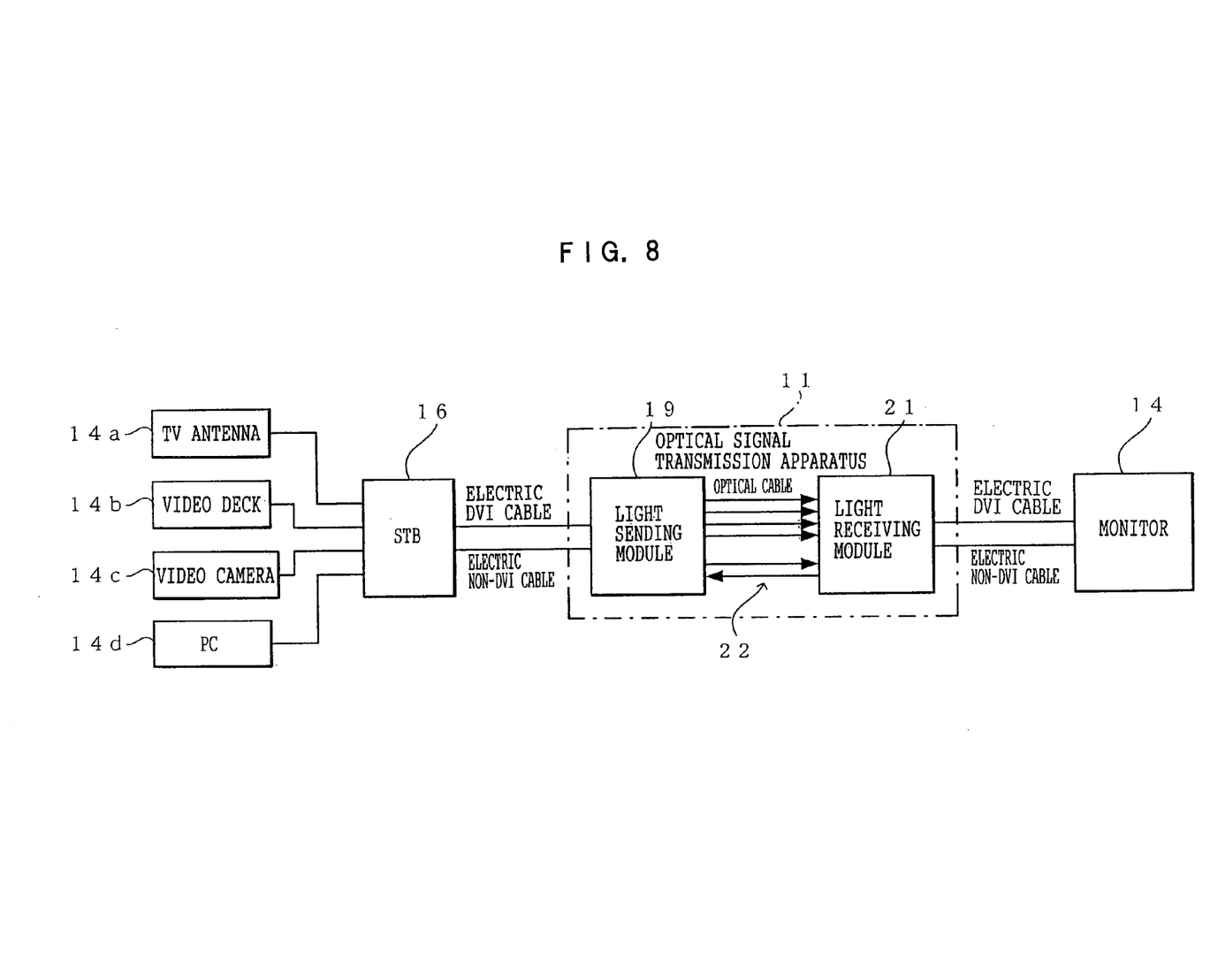
FIG. 8 is a block diagram illustrating a schematic configuration of a modification of the video signal transmission system according to embodiments of the present invention.

As shown in FIG. 8, a video signal transmission system in the modification is a system which selects a video/image signal from various media to display it on a monitor 14, as in the above embodiment.

The various media are, for example, a TV antenna 14*a*, a video deck 14*b*, a video camera 14*c*, a personal computer (PC) 14*d*, and the like. The system can be used with television signals obtained from the antenna 14*a*, video signals obtained from the video deck 14*b*, video cameras 14*c*, and the like, image signals obtained from the PC 14*d*, and the like, as explained in the above embodiment.

A video/image signal from each of the various media is outputted as a video signal corresponding to each of various interfaces by a device called a set top box (STB) 16. This set top box 16 selects a video/image signal and outputs it as a video signal, through an optical signal transmission device 11 to be displayed on the monitor 14, such as a plasma display.

As signals which can be transmitted by the optical signal transmission device 11, DVI signals and the like to the DVI standard are applicable, as in the above embodiment. This is a standard which is a video signal standard defined by DDWG (Digital Display Working Group), an industry organization. In addition to the DVI signals, non-DVI signals are also covered, which are used for exchanging audio information, remote control information and the like.

The DVI signals are: R, G, B video signals (TMDS data0, TMDS data1, TMDS data2) and a pixel clock (TMDS Clock), which are 4-bit differential signal pairs called TMDS signals; a DDC signal, consisting of a DDC Clock and DDC Data for exchanging display information between the host (STB 16) and the monitor 14; a 5V Power signal; and, a HPD signal for indicating the status of connection between the host 16 and the monitor 14. Non-DVI signals are an audio signal and signals for exchanging remote control information (herein called user data). Here the combination of the image signal for each color and the pixel clock is referred to as a video signal.

(Optical Signal Transmission Apparatus)

Figure 9:
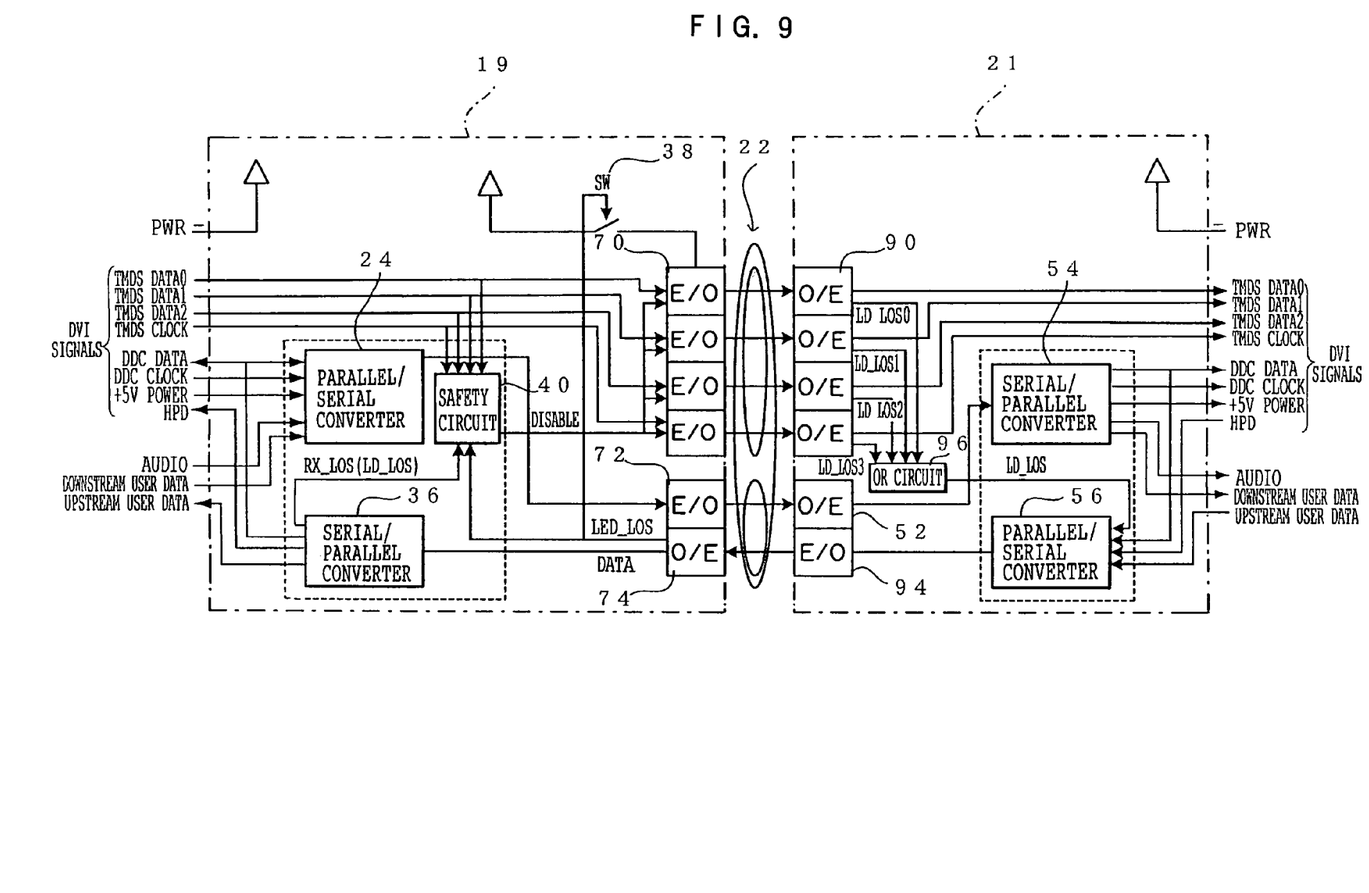
FIG. 9 is a block diagram illustrating a configuration of an optical signal transmission apparatus in the video signal transmission system in the modification.

As shown in FIG. 8 and FIG. 9, the optical signal transmission apparatus 11 comprises a light sending module 19, a light receiving module 21, and optical cables 22 for connecting these modules to each other, and transmits a video signal as a signal having at least one data width from the light sending module 19 to the light receiving module 21 through the optical cables 22.

(Light Sending Module)

The light sending module 19 is provided with an E/O converter 70 for each of the video signals for converting the video signals of the DVI signals from electric to optical, and converts the video signals sent from the host 16 side from electric to optical to transmit them to the light receiving module 21 through the optical cables 22. Each E/O converter 70 using an LD to transmit the optical signal to the light receiving module 21. In other words, the E/O converter 70 for transmitting a video signal comprises an LDD 26, an LD 28, a PD 30, and the like as in the above embodiment. The optical cables 22 are provided, corresponding to the respective video signals.

The DVI signals other than the video signals and non DVI signals are converted to serial signals by a parallel/serial converter 24, as in the above embodiment, before being converted from electric to optical to be transmitted to the light receiving module 21. Because the DVI signals other than the video signals and the non DVI signals are not high-speed signals, the E/O converter 72 uses an LED for transmitting light. For example, the driver 58, the LED 60, and the like as in the above embodiment can be used.

In other words, the signals from the host 16 to the monitor 14 are video signals, a DDC signal, a 5V Power signal, an audio signal, and a user data down signal, as in the above embodiment. The respective video signals of the signals inputted to the light sending module 19 are converted from electric to optical signals by the respective corresponding E/O converter 70 before being transmitted to the light receiving module 21 through the optical cables 22. The remaining signals (the DDC signal, the 5V Power signal, the audio signal, and the downstream user data signal) are converted from parallel to serial before being converted from electric to optical to be transmitted to the light receiving module 21. In the modification, the video signals for each color (TMDS data0, TMDS data1, TMDS data2) and the pixel clock (TMDS Clock) correspond to the optical main-signal.

Because the optical main-signal contains video signals, high-speed signaling is required, and for example, a transmission rate of 1.62 Gbps or over is required for UXGA (1600× 1200 pixels). Therefore, a laser diode which is capable of high-speed modulation (for example, Fuji Xerox VCSEL-AM-0001-C or the like) is used, and a relatively high laser output is required.

Further, the light sending module 19 is provided with an O/E converter 74 for receiving an optical signal outputted from an O/E converter 94, described later, in the light receiving module 21, and converting it from optical to electric. As the O/E converter 74, the PD 32, the AMP 34, and the like as in the above embodiment can be used.

The signal converted to an electric signal by the O/E converter 74 is converted to a parallel signal by a serial/parallel converter 36 to be outputted to the host 16 in the same way as that in the above embodiment.

Further, an LED_LOS signal, which indicates whether or not light is being received from the light receiving module 21, is extracted from the signal converted to an electric signal by the O/E converter 74. This LED LOS signal is outputted to a safety circuit 40 and a switch 38, as a first control component. In the serial/parallel converter 36, an LD_LOS (Loss of Power) signal included in the signal transmitted from the light receiving module 21, which indicates the reception status of the optical main-signal, is outputted to the safety circuit 40 as an Rx_LOS signal. The optical signal transmitted from the light receiving module 21 to the light sending module 19 is called an optical sub-signal. The LED_LOS signal is a binary level signal, which is outputted at the low level in the normal status and at the high level in the status indicating non-receiving.

(Safety Circuit)

The safety circuit 40 has the same configuration as the above embodiment, excepting in that the respective video signals are directly inputted to the video information detection circuit 46 in the safety circuit 40, and that a disable signal outputted from the Disable signal control circuit 50 is outputted to each respective E/O converter 70, thus the description is omitted.

The light receiving module 21 is provided with O/E converters 90 for optical-to-electric conversion of the light received from the light sending module 19 through the optical cables 22. The electric signals as a result of the conversion by the O/E converters 90 are directly outputted to the monitor 14 side.

In the modification, the optical main-signal is received by the four O/E converters 90, thus each reception status (LD_LOS0, LD_LOS1, LD_LOS2, LD_LOS3) of the optical main-signal are outputted to the parallel/serial converter 56 through an OR circuit 96. In other words, in such a case as when any one of the reception statuses of the optical main-signal is non-receiving, the OR circuit 96 outputs an LD_LOS signal as a signal indicating that the reception status of the optical main-signal is non-receiving. In the present embodiment, the LD_LOS signal is set to be at the low level in the normal status, and is outputted as a high level when no optical signal is received due to such a cause as the optical plug being disconnected or the fiber being broken resulting in damage, as explained in the above embodiment.

The transmission paths for the signals other than the video signals transmitted from the light sending module 19, and the optical sub-signal transmitted from the light receiving module 21 to the light sending module 19 are the same as those in the above embodiment, thus description is omitted.

The optical cable 22 has basically the same configuration as in the above embodiment, excepting in that the number of terminals is increased with the increase in the number of optical fibers used, corresponding to the respective video signals.

In other words, by connecting/disconnecting the optical plugs to/from the light sending module 19 and light receiving module 21, connection/disconnection of the optical fibers for the optical main-signal and the optical fiber for the optical sub-signal can be performed simultaneously.

If the system is configured as described above, it is capable of functioning in the same manner as that in the above embodiment, by the optical main-signal being stopped when the optical cable 22 has a failure, including connection/disconnection of the optical plug. In other words, even if the optical signal transmission device 11 is configured as the modification, leakage of the laser light, due to such a cause as the optical cable 22 being unconnected or damaged, can be prevented. In addition, a two-stage control is provided as in the above embodiment. Thus if either one of the controls fails, the other control can prevent the laser light from leaking, which allows the safety to be improved.

In addition, with the modification, the video signals, which are high-speed signals, are processed in parallel, thus video signals providing a larger image screen/of a larger volume can be transmitted, as compared to the above embodiment.

In the above embodiment, the optical fiber for transmitting the optical main-signal and the optical fiber for transmitting the optical sub-signal respectively are separately provided. However, the system may be configured with only a single optical fiber. In this case the need arises for such measures as transmitting the optical main-signal and the optical sub-signal by a time sharing method, or providing a function for isolating the optical main-signal and the optical sub-signal from each other, and the like.

As described above, the first aspect of the present invention provides an optical signal transmission apparatus for carrying out bi-directional light transmission, comprising a light sending module for sending an optical main-signal having at least one data width, and receiving an optical sub-signal including a control signal; a light receiving module for receiving the optical main-signal and sending the optical sub-signal; and an optical cable for connecting between the light sending module and the light receiving module, wherein the light sending module comprises a control component which controls the output of the optical main-signal such that, in at least one of the cases when the optical sub-signal including the reception status of the optical main-signal as data is non-receiving, and when the reception status is non-receiving, the output of the optical main-signal is stopped.

The control component may be made up of a first control component which, when the optical sub-signal is not being received, stops the output of the optical main-signal, and a second control component which, when the reception status is non-receiving, stops the output of the optical main-signal. In other words, by providing a two-stage control (the control by the first control component and the control by the second control component), even if one control component fails, the other control component can positively prevent light from leaking from the light source for the optical main-signal, which allows safety to be improved.

The second control component may comprise a validation component, which validates the data when the reception status of the optical main-signal has been received a prescribed number of times. By providing such a validation component, malfunctioning can be prevented, even if the received data of the optical sub-signal has errors as noise.

Further, the optical signal transmission apparatus may be adapted such that when the optical main-signal is being stopped by the control component and the optical sub-signal changes from not being received to being received, a reset operation is repeated a prescribed number of times for each prescribed time interval until the reception status [of the optical main signal] changes to indicate receiving. Wherein the reset operation the control component releases the stopping of the output of the optical main-signal, and if the reception status of the optical main-signal remains non-receiving for a predetermined period of time the control component re-stops the output of the optical main-signal. Or wherein a reset operation in which the control component cancels the stopping of the output of the optical main-signal when the optical sub-signal changes to being received after the power for the light sending module is turned on, and if the reception status of the optical main-signal remains non-receiving for a predetermined period of time, the control component stops the output of the optical main-signal. This reset operation being repeated a prescribed number of times for each prescribed time interval until the reception status of the optical main-signal changes to indicating receiving.

The optical main-signal may comprise video signals. In this case, the control component may be adapted such that there is a reset operation in which: when the video signals are in a no signal status, the control component stops the output of the optical main-signal; when the optical sub-signal is being received, and a change is detected of the video signal changing from no signal status to a signal status, the control component cancels the stopping of the optical main-signal; then if the reception status of the optical main-signal continues to be non-receiving for a predetermined period of time, the control component re-stops the output of the optical main-signal. This reset operation being repeated a prescribed number of times for each prescribed time interval until the reception status of the optical main-signal changes to receiving.

Further, the optical plug for the optical cable(s) for transmitting the optical main-signal and that for the optical cable(s) for transmitting the optical sub-signal may be integrally formed. Thereby, connection/disconnection of the optical cable(s) for the optical main-signal and that of the optical cable(S) for the optical sub-signal can be carried out simultaneously.

Further, light transmission of the optical sub-signal may be carried out by using an LED for outputting visible light. By using an LED, safety is secured, if the optical sub-signal should leak, and operation checks can be carried out.

What is claimed is:

1. An optical signal transmission apparatus that carries out bi-directional light transmission, the apparatus comprising:
   a light sending module that sends an optical main-signal having at least one data width, and receives an optical sub-signal including a control signal;
   a light receiving module that receives the optical main-signal and sends the optical sub-signal; and
   an optical cable that connects the light sending module with the light receiving module, wherein
   the light sending module comprises a control component which controls the output of the optical main-signal such that, the output of the optical main-signal is stopped when
   the optical sub-signal, which includes data indicating a reception status of the optical main-signal, is not being received by the light sending module, and
   the output of the optical main-signal is stopped when the reception status of the optical main-signal is indicating non-receiving by the light receiving module, and
   when the optical main-signal is being stopped by the control component, and the optical sub-signal changes from not being received to being received,
   a reset operation is repeated a prescribed number of times for each prescribed time interval until the reception status of the optical main-signal changes to indicating receiving,
   wherein during the reset operation,
   the control component releases stopping of the output of the optical main-signal, and
   if the reception status of the optical main-signal remains indicating non-receiving for a predetermined period of time, the control component re-stops the output of the optical main-signal.

2. The optical signal transmission apparatus of claim 1, wherein the control component comprises
   a first control component part which, when the optical sub-signal is not being received by the light sending module, stops the output of the optical main-signal, and
   a second control component part which, when the reception status of the optical main-signal is indicating non-receiving by the light receiving module, stops the output of the optical main-signal.

3. The optical signal transmission apparatus of claim 2, wherein the second control component part comprises a validation component which validates data when the reception status is received a prescribed number of times.

4. The optical signal transmission apparatus of claim 1, wherein
   after the power for the light sending module has been turned on, the optical sub-signal changes from not being received to being received and the reset operation is repeated.

5. The optical signal transmission apparatus of claim 1, wherein the optical main-signal comprises a video signal.

6. The optical signal transmission apparatus of claim 5, wherein
   when the video signal is in a no signal status, the control component stops the output of the optical main-signal, and
   when the optical sub-signal is being received and a change is detected of the video signal changing from the no signal status to a signal status, the reset operation is repeated.

7. The optical signal transmission apparatus of claim 1, wherein an optical plug for the optical cable(s) for transmitting the optical main-signal is formed integrally with an optical plug for the optical cable(s) for transmitting the optical sub-signal.

8. The optical signal transmission apparatus of claim 1, wherein light transmission of the optical sub-signal is carried out by using an LED for outputting visible light.

9. An optical signal transmission method for carrying out bi-directional light transmission, comprising:
   (a) sending a optical main-signal having at least one data width, and receiving a optical sub-signal including a control signal using a light sending module;
   (b) receiving the optical main-signal and sending the optical sub-signal using a light receiving module; and (c) controlling the output of the optical main-signal such that the output of the optical main-signal is stopped when the optical sub-signal, which includes data indicating a reception status of the optical main-signal, is not being received by the light sending module, and the output of the optical main signal is stopped when the reception status of the optical main-signal is indicating non-receiving by the light receiving module, using a control component in the light sending module, wherein at (c) when the optical main-signal is being stopped and the optical sub-signal changes from not being received to being received, a reset operation is repeated a prescribed number of times for each prescribed time interval until the reception status of the optical main-signal changes to indicating receiving wherein during the reset operation,
the stopping of the output of the optical main-signal is released, and
if the reception status of the optical main-signal remains indicating non-receiving for a predetermined period of time, the output of the optical main-signal is re-stopped.

10. The optical signal transmission method of claim 9, wherein at (c), after the power for the light sending module has been turned on, the optical sub-signal changes from not being received to being received and the reset operation is repeated.

* * * * *